(12) United States Patent  
Narasimhan et al.

(10) Patent No.: US 8,625,407 B2  
(45) Date of Patent: Jan. 7, 2014

(54) HIGHLY AVAILABLE VIRTUAL PACKET NETWORK DEVICE

(75) Inventors: Janardhanan P. Narasimhan, Chennai (IN); Sanjeev Agrawal, San Jose, CA (US); Purushothaman Nandakumaran, San Jose, CA (US); Joyas Joseph, San Jose, CA (US)

(73) Assignee: Force10 Networks, Inc., San Jose, CA (US)

( * ) Notice: Subject to any disclaimer, the term of this patent is extended or adjusted under 35 U.S.C. 154(b) by 600 days.

(21) Appl. No.: 12/881,329

(22) Filed: Sep. 14, 2010

(65) Prior Publication Data

US 2012/0063299 A1   Mar. 15, 2012

(51) Int. Cl.  
*G01R 31/08* (2006.01)

(52) U.S. Cl.  
USPC .......................................... 370/218; 370/318

(58) Field of Classification Search  
None  
See application file for complete search history.

(56) References Cited

U.S. PATENT DOCUMENTS

| | | | | |
|---|---|---|---|---|
| 5,675,807 A * | 10/1997 | Iswandhi et al. | ............... | 710/260 |
| 5,754,865 A * | 5/1998 | Itskin et al. | ..................... | 710/241 |
| 6,252,878 B1 * | 6/2001 | Locklear et al. | ............... | 370/401 |
| 6,574,477 B1 * | 6/2003 | Rathunde | ....................... | 455/453 |
| 6,751,191 B1 * | 6/2004 | Kanekar et al. | ............... | 370/217 |
| 7,236,453 B2 * | 6/2007 | Visser et al. | ................... | 370/219 |
| 7,518,986 B1 * | 4/2009 | Chadalavada et al. | ......... | 370/218 |
| 7,545,757 B2 * | 6/2009 | Di Benedetto et al. | ....... | 370/256 |
| 7,940,650 B1 * | 5/2011 | Sandhir et al. | ................. | 370/219 |
| 8,345,536 B1 * | 1/2013 | Rao et al. | ....................... | 370/216 |
| 2002/0029301 A1 * | 3/2002 | Toda | ............................... | 709/319 |
| 2002/0032850 A1 * | 3/2002 | Kauffman | ........................ | 712/31 |
| 2002/0097672 A1 * | 7/2002 | Barbas et al. | .................. | 370/216 |
| 2003/0037165 A1 * | 2/2003 | Shinomiya | ..................... | 709/238 |
| 2003/0120915 A1 * | 6/2003 | Kleinsteiber et al. | .......... | 713/153 |
| 2003/0163692 A1 * | 8/2003 | Kleinsteiber et al. | .......... | 713/169 |
| 2003/0179532 A1 * | 9/2003 | Goergen | ........................ | 361/118 |
| 2003/0189936 A1 * | 10/2003 | Terrell et al. | .............. | 370/395.31 |
| 2004/0223504 A1 * | 11/2004 | Wybenga et al. | .............. | 370/412 |
| 2005/0013308 A1 * | 1/2005 | Wybenga et al. | .............. | 370/396 |
| 2005/0074003 A1 * | 4/2005 | Ball et al. | ........................ | 370/389 |
| 2005/0111445 A1 * | 5/2005 | Wybenga et al. | .............. | 370/389 |
| 2005/0135357 A1 * | 6/2005 | Riegel et al. | ................... | 370/389 |
| 2005/0169193 A1 * | 8/2005 | Black et al. | .................... | 370/254 |
| 2005/0249113 A1 * | 11/2005 | Kobayashi et al. | ............. | 370/219 |
| 2007/0070919 A1 * | 3/2007 | Tanaka et al. | .................. | 370/254 |
| 2008/0068986 A1 * | 3/2008 | Maranhao et al. | ............. | 370/220 |
| 2008/0147866 A1 * | 6/2008 | Stolorz et al. | ................. | 709/226 |
| 2008/0285248 A1 * | 11/2008 | Goergen | ........................ | 361/788 |
| 2009/0034728 A1 * | 2/2009 | Goergen et al. | ................ | 380/268 |
| 2009/0037998 A1 * | 2/2009 | Adhya et al. | ..................... | 726/11 |
| 2009/0257440 A1 * | 10/2009 | Yan et al. | ....................... | 370/401 |
| 2009/0259741 A1 * | 10/2009 | Shen et al. | ..................... | 709/223 |
| 2009/0268748 A1 * | 10/2009 | Ghaibeh et al. | ............... | 370/419 |
| 2009/0303902 A1 * | 12/2009 | Liu et al. | ........................ | 370/254 |

(Continued)

*Primary Examiner* — Ian N Moore  
*Assistant Examiner* — Dung B Huynh  
(74) *Attorney, Agent, or Firm* — Haynes and Boone, LLP (57) ABSTRACT

A virtual chassis includes two or more physical chassis and operates as a single, logical device. Each of the two or more physical chassis include two route processor modules (RPM) and each RPM is assigned a first and a second role within the virtual chassis. The first role is a physical chassis level role and the second role is a virtual chassis level role. The RPMs operate in coordination such that the failure of any one of the RPMs results in one or more other RPMs taking over the first and second roles of the failed RPM.

17 Claims, 10 Drawing Sheets

(56) References Cited

U.S. PATENT DOCUMENTS

| | | | |
|---|---|---|---|
| 2010/0182926 A1* | 7/2010 | Kubota | 370/252 |
| 2010/0318831 A1* | 12/2010 | Scott et al. | 713/600 |
| 2011/0066753 A1* | 3/2011 | Wang et al. | 709/238 |
| 2011/0154471 A1* | 6/2011 | Anderson et al. | 726/11 |
| 2011/0228779 A1* | 9/2011 | Goergen | 370/392 |

* cited by examiner

HIGHLY AVAILABLE SWITCH/ROUTER 200

FIG. 3

MULTIPLE STACKED CHASSIS 300

FIG. 4

VIRTUAL CHASSIS 400

FIG. 5

VIRTUAL CHASSIS 500

ROLE ELECTION PROCESS-SECOND PHASE

HIGHLY AVAILABLE VIRTUAL PACKET NETWORK DEVICE

BACKGROUND

1. Field of the Invention

The present disclosure relates generally to packet network devices such as switches and routers, and more particularly to a virtual packet network device architecture that recovers from the failure of any single route processor module without the loss of the network device functionality.

2. Description of Related Art

Packet network devices direct data packets traveling across a network between data sources and destinations. Packet network devices can perform "routing" or "switching" depending on the header information and networking techniques used to direct the data packets and a single packet network device may be configured to perform both switching and routing. Such devices are referred to herein as a "packet switch" with the understanding that this term encompasses a wide variety of packet forwarding capabilities.

Figure 1A:
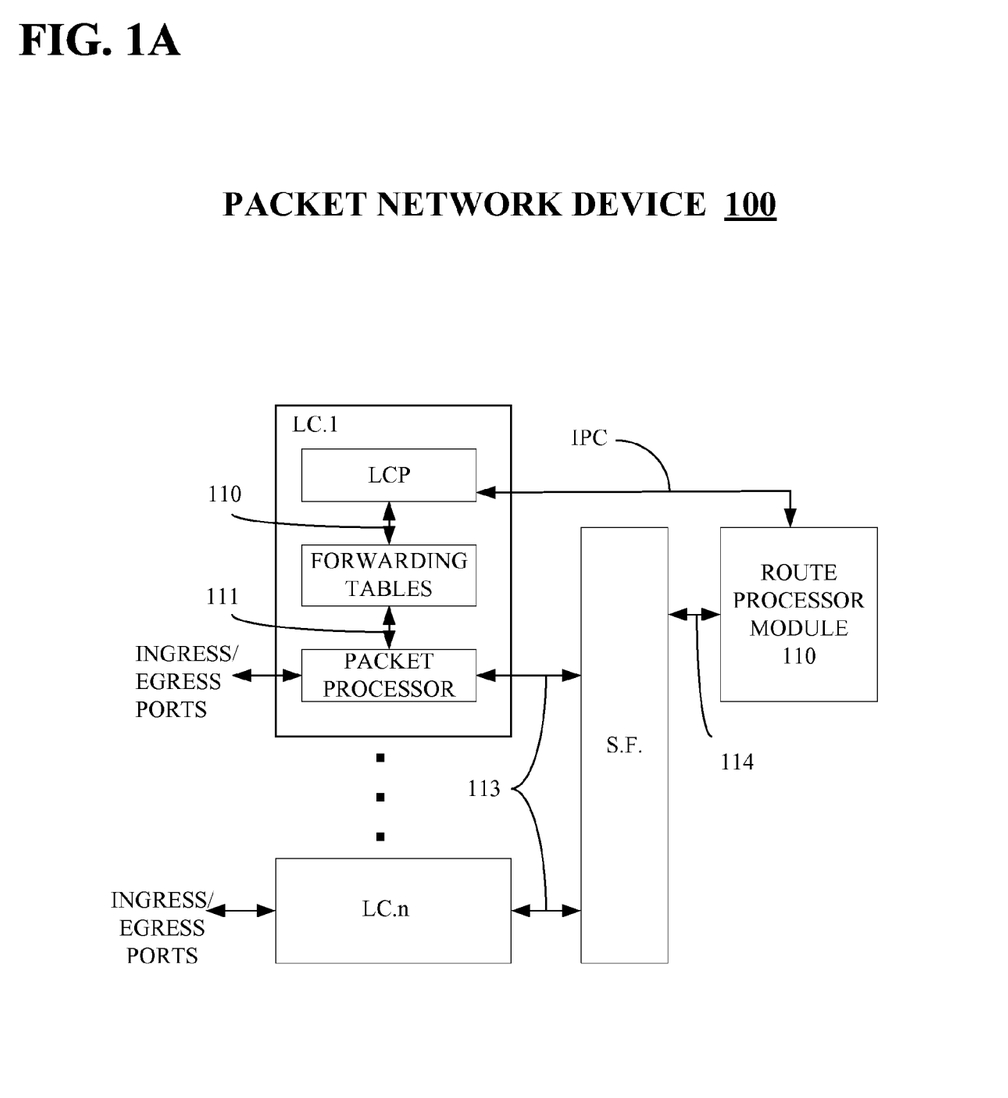
FIG. 1A is a block diagram showing functionality comprising a packet network device 100.

FIG. 1A is a high-level block diagram of an exemplary packet switch 100. The switch comprises some number of line cards (LC), LC1-LCn, one or more switch fabric cards (SF), and one route processor module (RPM) 110. Each line card LC receives ingress data traffic from and transmits egress data traffic over network links to peer devices through bi-directional ports. The ports can be configured for different electrical or optical media via the use of different line card types, different port interface modules, and/or different pluggable optics modules.

Continuing to refer to FIG. 1A, for most ingress packet traffic on each line card LC, a line card packet processor examines a packet, determines one or more switch egress ports for the packet, and queues the packet for transmission through the switch fabric when possible. For most egress packet traffic on each line card LC, the line card queues the packets arriving from the switch fabric, and selects packets from the queues and serves them fairly to the egress ports. Each LC includes memory that is used to store lookup tables that a packet processor accesses to determine what operations to perform on each packet, as well as the next hop destination for each packet. Each LC also includes a line card processor (LCP) which can be a general purpose processor that handles control plane operations for the line card. Control plane operations include programming lookup memory according to instructions from the RPM, programming registers on the packet processor that tailor the line card behavior, receiving control plane packets (packets addressed to switch 100, e.g., for various routing/switching protocols) from the packet processor, and transmitting control plane packets (packets generated by switch 100 for communication to a peer device) to the packet processor for forwarding out an external port. The LCP may implement some control plane functionality for some protocols handled by switch 100.

The LCP in FIG. 1A also connects to the RMP over an inter-process communication (IPC) bus. The RPM uses the IPC bus to communicate with the LCP in order to boot the line cards, monitor the health of the line card and its environmental parameters, manage power for the line card and its components, and perform basic hardware configuration for the line card. The switch fabric (SF) can be comprised of one or more modules each of which are generally identical in a system. The switch fabric (SF) provides serdes interfaces for each line card and a parallel crossbar switch that can switch any of the inputs to any number of the outputs.

Figure 1B:
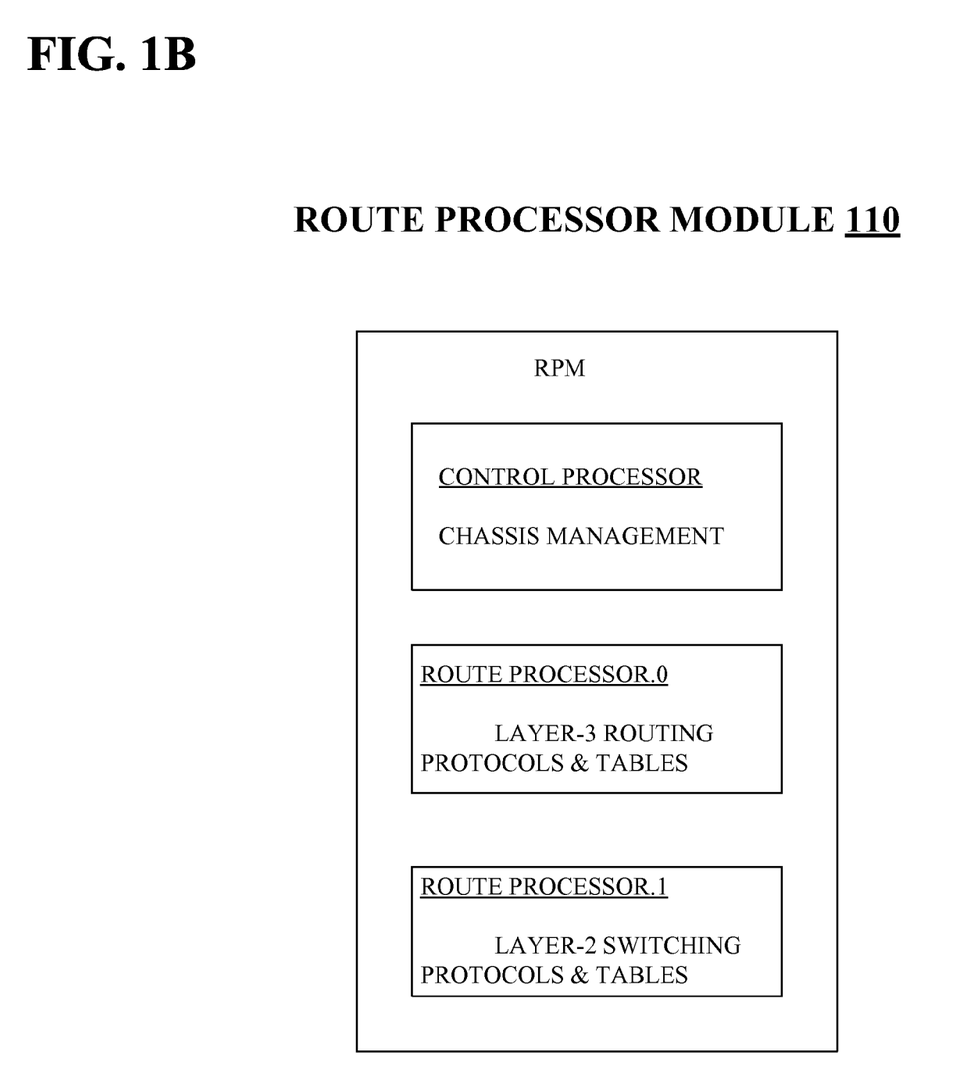
FIG. 1B is a block diagram showing functionality comprising a route processor module 110.

The route processing module (RPM) 110 shown in FIG. 1A controls all aspects of the overall operation of the chassis. FIG. 1B illustrates the functionality of the RPM 110 of FIG. 1A in more detail. The RPM in FIG. 1B can be comprised of three processors: a control processor CP, which controls the overall operation of the switch; and two route processors RP.0, RP.1, which run different routing/switching protocols, communicate with external peers, and program the line cards to perform correct routing and switching. In this case, the CP can be dedicated to running certain management functions such as user interface management, system chassis management, system configuration management and management of system security to name only a few functions. RP.0 can be dedicated to running layer 3 routing protocols such as the border gateway protocol (BGP), the open shortest path first (OSPF) protocol, routing information protocol (RIP) to name just a few, and RP.1 can be dedicated to running layer 2 switching protocols such as the Internet group management protocol (IGMP), address resolution protocol (ARP), spanning tree protocol (STP) and the virtual router redundancy protocol (VRRP) to name just a few. The routing protocols running on RP.0 generally send messages to and receive messages from the surrounding network devices in order to learn certain information about these devices and their relationship to the network. This information can include their IP address, distance information, link attributes, group membership information to name only a few. The switching protocols running on RP.1 generally gather information from the packets being processed by the host device, which in this case is the router 100. This information can include the MAC address and the port I.D. of another network device. The information received by the protocols running on RP.0 and RP.1 can be used to derive the shortest path from the host network device to another, neighboring network device or to calculated the distance between two network devices, to calculate a next hop address for instance or spanning trees and other information used to construct and maintain layer 2 switching tables and layer 3 routing tables. The switching table and routing table information is then made available to the line card control processors which use this information to update forwarding tables which are used by the packet processors to process packets or frames of information arriving at the router 100. The processes that are employed to build and maintain routing and switching tables on the RPMs and to build and maintain lookup tables on each of the LCs will not be described here, as these processes are well known to those skilled in packet network device design. Although the RPM 110 is described above as being comprised of three processors, CP, RP.0 and RP.1, all of the functionality included in the three processors can be included in one processor or two or more processors. The number of processors employed to implement this functionality is not important.

Figure 2:
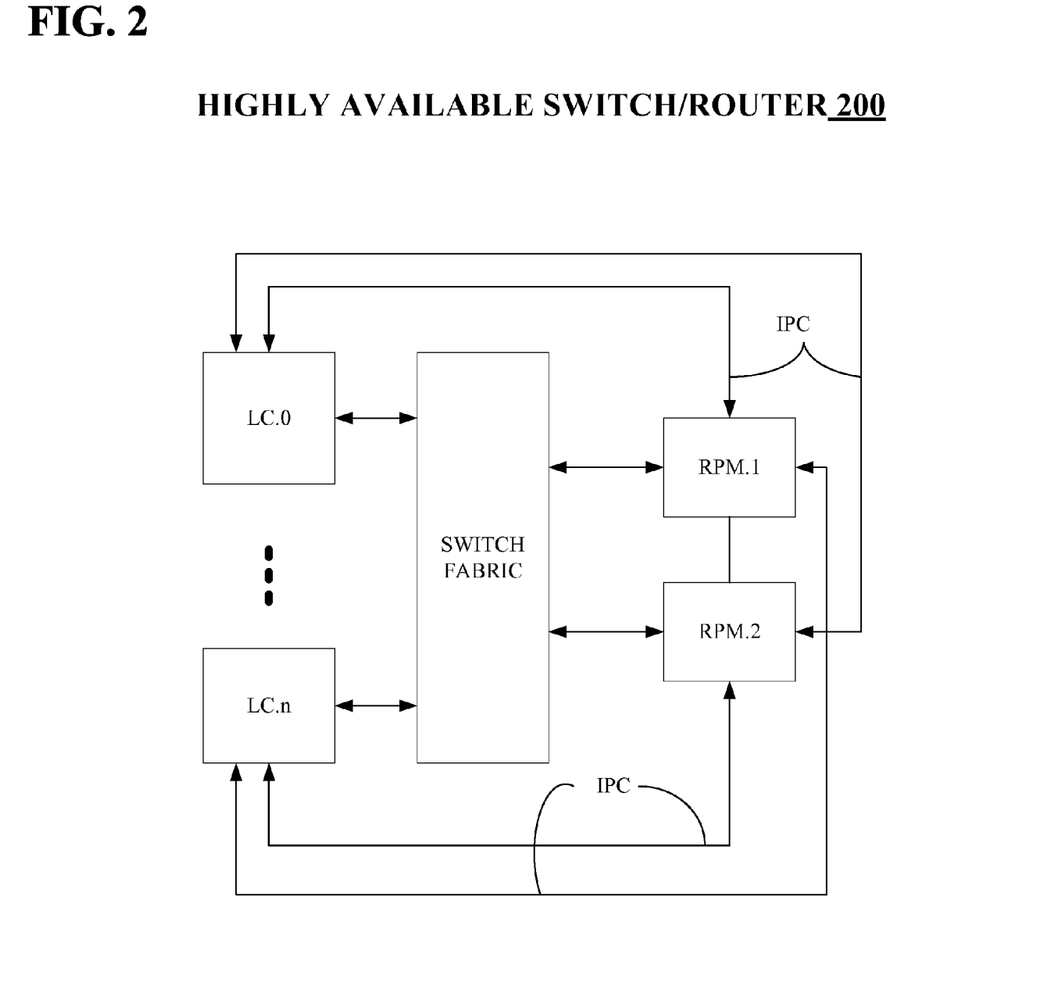
FIG. 2 is a block diagram showing functionality comprising a highly available router 200.

In order to provide a higher degree of availability than the switch 100 described with reference to FIG. 1A, some packet network devices are designed to include two route processor modules. FIG. 2 illustrates such a packet network device that includes two route processor modules, RPM.1 and RPM.2. Each of the RPMs in FIG. 2 can include all of the functionality of the RPM described with reference to FIG. 1A and generally operate to control all aspects of the overall operation of the chassis. When two RPMs are present, one is designated as the master, and the other remains on standby (warm or cold standby) and only the master operates to control the functionality of the switch. The standby RPM monitors the health of the master, and takes over as master should the first fail. As described earlier with reference to FIG. 1A, each RPM comprises three processors: a control processor CP, which controls the overall operation of the switch; and two route processors RP.0, RP.1, which run different routing/switching protocols.

Figure 3:
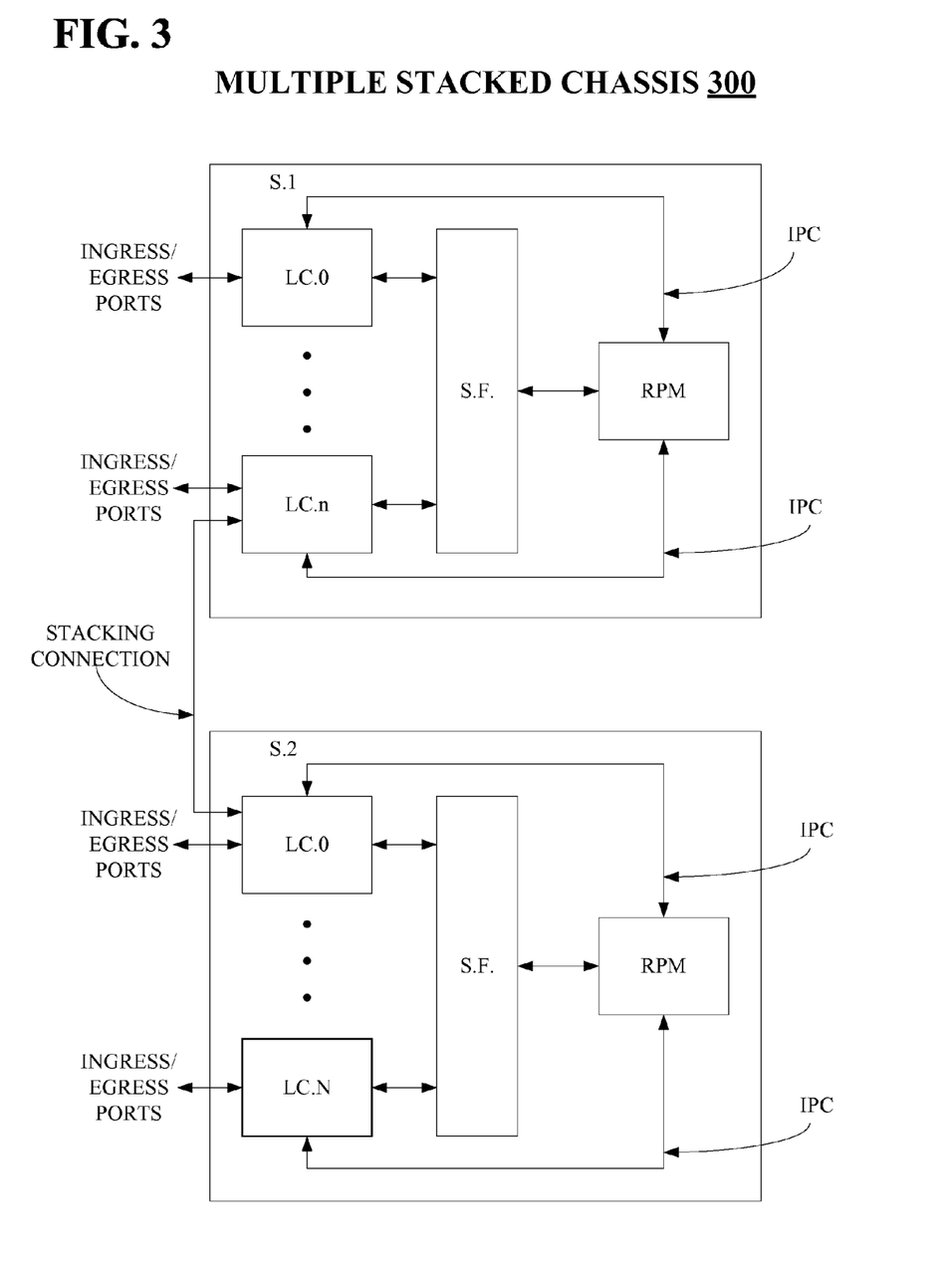
FIG. 3 is a block diagram showing functionality comprising a stacked chassis 300.

As described above with reference to FIGS. 1A and 2, a single packet switch/router can only support a finite number of line cards and ports. In order to provide a switching platform with a larger number of ports, some vendors have designed special link cards or a "back-end" port that can be used to connect two separate switches together to form a system that in at least some ways acts with peer devices like a single larger chassis. Such an arrangement of stacked switches is described in the background section of U.S. patent publication no. 2009/0268748. FIG. 3 shows such a stacked switch arrangement that includes two switches, S.1 and S.2 connected together to operate as a single, logical device. Typically, stacked switches operate such that one switch is designated to be the master switch and operates to run all of the layer-2 switching and layer-3 routing protocols and the other switch operates as a slave. The master device also operates to update the forwarding tables included in the other slave devices connected in the stacked arrangement. However, in the event that the master switch/device fails, the entire stacked chassis can become inoperable. In order to mitigate this problem, some vendors have designated one switch or device to be a primary master device and the other slave devices in the stack to be designated as secondary or backup master devices. Using this arrangement, in the event that the primary master device in the stack fails, the secondary master device is able to take over all of the functionality performed by the primary master prior to its failure, however, all of the functionality of the failed master device is lost.

SUMMARY

While the switch including two RPMs described with reference to FIG. 2 does provide a single switch with an improved level of availability, such as switch has a limited port count, and while the stacked chassis arrangement described with reference to FIG. 3 does provide a higher number of input/output ports in a single logical chassis, in the event that one of the chassis in the stack fails, all of the ports associated with the chassis are no longer available to the logical chassis. Therefore, it would be beneficial if a single, logical chassis both included a high number of ports and the failure of any one chassis in the single, logical chassis did not result in the reduction of the number of ports available to forward network traffic.

In one embodiment, a virtual packet network device includes two or more separate physical chassis connected in a stacking relationship, and each of the physical chassis include two route processor modules, and each of the route processing included in the virtual packet network device as assigned first and second logical roles, wherein the first logical role is a physical chassis level role and the second logical role is a virtual chassis level role, and the route processor modules operate in cooperation to respond to the failure of any single route processor module to take over the logical roles assigned to the failed route processor module without the loss of functionality of the virtual packet network device.

DETAILED DESCRIPTION

Figure 4:
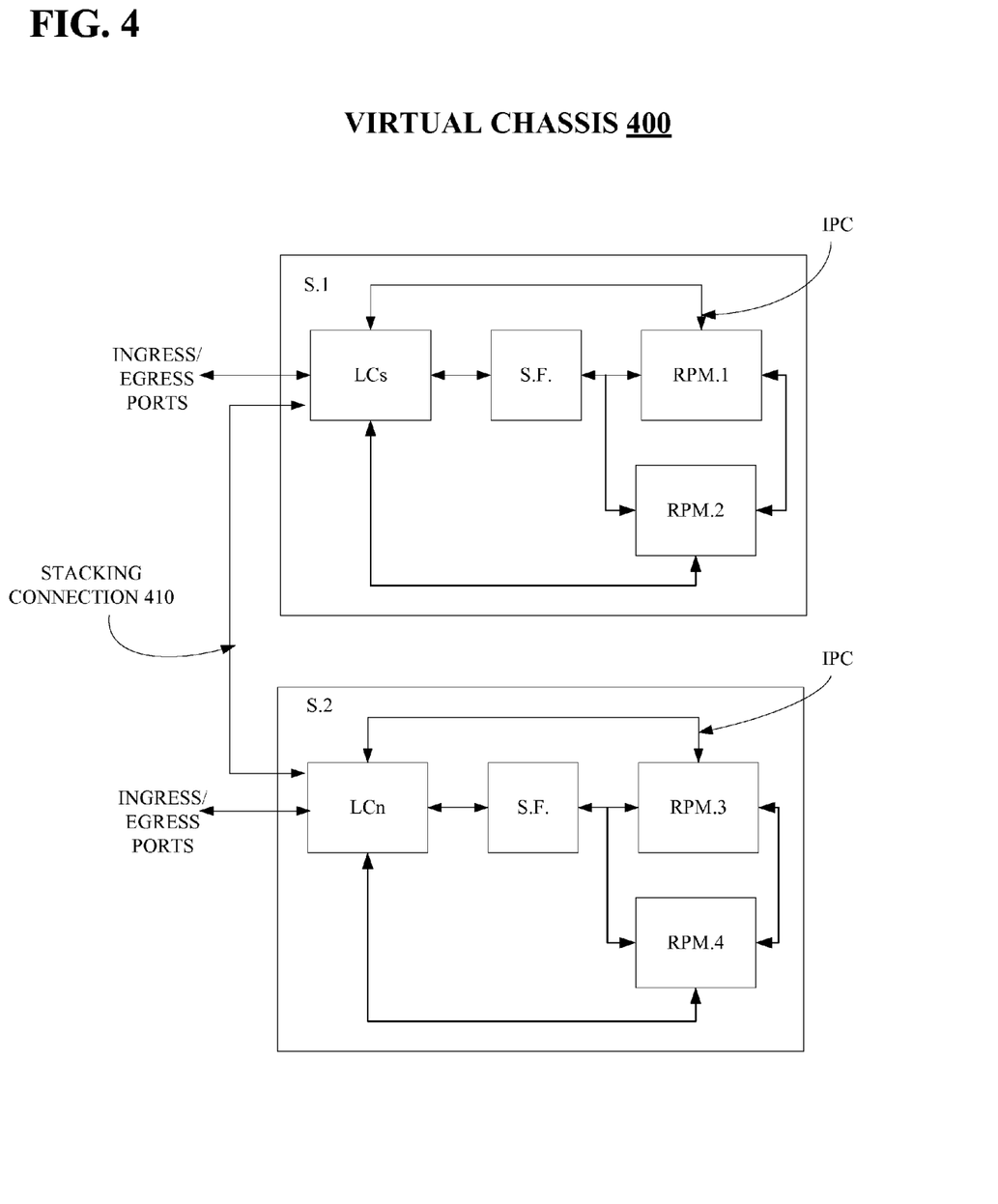
FIG. 4 is a block diagram showing functionality comprising a virtual chassis 400.

The embodiments described below take a novel approach by creating a single, logical, highly available chassis arrangement. FIG. 4 is a block diagram of a representative embodiment of a single, logical packet network device (virtual chassis/packet network device) comprised of two separate physical packet network devices/chassis S.1 and S.2, with each of the physical chassis including two RPMs for a total of four RPMs, RPM.1-RPM.4. Several well known methods exist for stacking multiple individual switches so that they operate as a single, logical chassis. One method employs special stacking ports in each physical chassis that are connected via a special stacking cable, another chassis stacking method employs regular ingress/egress ports and special purpose hardware to implement a stacked chassis and yet another method employs regular ingress/egress ports and no special hardware to implement a stacked chassis. Several of these methods for stacking multiple individual chassis are described in U.S. patent publication number 2009/0268748, the entire contents of which are incorporated herein by reference. Regardless of the method employed to stack chassis, the ultimate goal of doing so remains increasing the number of ports available on a single, logical or virtual chassis to route network traffic.

As described above, the embodiment of a virtual chassis 400 in FIG. 4, is comprised of two separate physical chassis and each physical chassis can be either a switch or a router. For the purpose of this description, a physical chassis is referred to herein as a switch. Both of the switches S.1 and S.2 are members of a single, logical or virtual chassis 400 and the switches are connected to each other by a stacking connection 401. Each switch also includes, among other things, two RPMs which can communicate with each other over an inter-process communication (IPC) bus. S.1 includes RPM.1 and RPM.2 and S.2 includes RPM.3 and RPM.4. Each switch on the virtual chassis 400 includes one or more line cards (LC) each of which includes a plurality of "front-end" ingress/egress ports, and each such port provides a connection available for linking the switch to a peer device or endpoint in a network. Those skilled in the art will recognize that the number of line cards, ports on each line card, RPMs, switch fabrics, and bus structure shown in FIG. 4 are but one among many possibilities for switch architectures that can be connected as a larger logical chassis according to an embodiment. It should be understood, that while the virtual chassis 400 is described in terms of including two switches, the virtual chassis can be configured with more than two switches.

With continued reference to FIG. 4, some of the functionality associated with the operation of virtual chassis 400 is managed locally to the switches S.1 and S.2, such as programming the switching fabric, election of chassis roles with respect to each RPM in a physical chassis, controlling a switch fan speed, monitoring the presence of line cards in the chassis, and downloading of the firmware to the line card CPU, and some of the functionality associated with the operation of virtual chassis 400 is global; that is, this global functionality affects the overall operation of the virtual chassis, such as multicast group programming, forwarding table maintenance, election of stack roles with respect to the RPMs in the virtual chassis and line card insertion/removal notification.

FIG. 4 illustrates one embodiment in which each RPM in both switches comprising the virtual chassis 400 can be assigned dual roles. This assignment of dual roles to each RPM permits both switches, S.1 and S.2 comprising the virtual chassis 400 to continue to operate in the presence of a failure of any single RPM without the loss of overall virtual chassis functionality. From one perspective, continuing to operate without the loss of chassis functionality can mean that the packet processing bandwidth of the virtual chassis does not drop in the event that any single RPM fails, or from another perspective it can mean that the number of ingress/egress ports available on the virtual chassis over which to receive and transmit data packets does not drop in the event that any single RPM fails. At any point in time during operation of the virtual chassis 400, only one of the two RPMs included in each of the switches S.1 and S.2 of the virtual chassis 400 is assigned a managing role with respect to the local operation of the physical switch on which it is located. The other RPM included in the switch is maintained in a hot standby role and its state is maintained such that it is ready to transition to the chassis management role in the event that the current RPM assigned to the chassis management role fails. Further, only one of the RPMs in the virtual chassis 400 is designated, at any point in time, to be in the role of managing the overall operations of the virtual chassis in which it is located. The remaining RPMs in the virtual chassis can be designated to assume one or several standby roles and can be ready to assume management of the chassis in the event that the current chassis master RPM fails.

Table 1 includes a listing of the roles that can be assigned to each of the RPMs, RPM.1-RPM.4, comprising the virtual chassis 400.

TABLE 1

| Role | Function of Role in Virtual Chassis |
| --- | --- |
| Chassis Master (CM) | Manages Local Resources, participates in stack election to determine stack master and roles for all RPMs in chassis, synchronizes its state with the chassis standby. |
| Chassis Standby (CS) | Maintains synchronous state with CM, monitors health of CM and transitions to CM role in event of CM failure. |
| Stack Master (SM) | Runs virtual chassis control and management plane functions, programs tables on all LCs in virtual chassis, synchronizes state with standby, sends periodic health messages, comm. with CM to manage chassis functions. |
| Stack Standby (SS) | Synchronizes state with SM, monitors health of SM |
| Stack Associate (SA) | Transitions to SS if SS fails or if SS role changes |

The RPM roles listed in Table 1 and other functionality that can be used in the role assignment process will now be described with reference to FIG. 5, which is a block diagram of an embodiment of a highly available virtual chassis 500. Virtual chassis 500 is comprised of two physical switches, S.1 and S.2, connected together in a stacked configuration by a stacking connection through ingress/egress ports associated with line cards included in each switch. Each of the switches are comprised of two RPMs. Switch S.1 includes RPM.1 and RPM.2 which can communicate with each other over an IPC link, and switch S.2 includes RPM.3 and RPM.4 which can also communicate with each other over an IPC link. It should be understood that, for the purpose of this description, the virtual chassis 500 is shown to include two physical switches, but this is not a limitation of a virtual chassis configuration, and that the virtual chassis 500 can be configured to include more than two physical switches.

Figure 5:
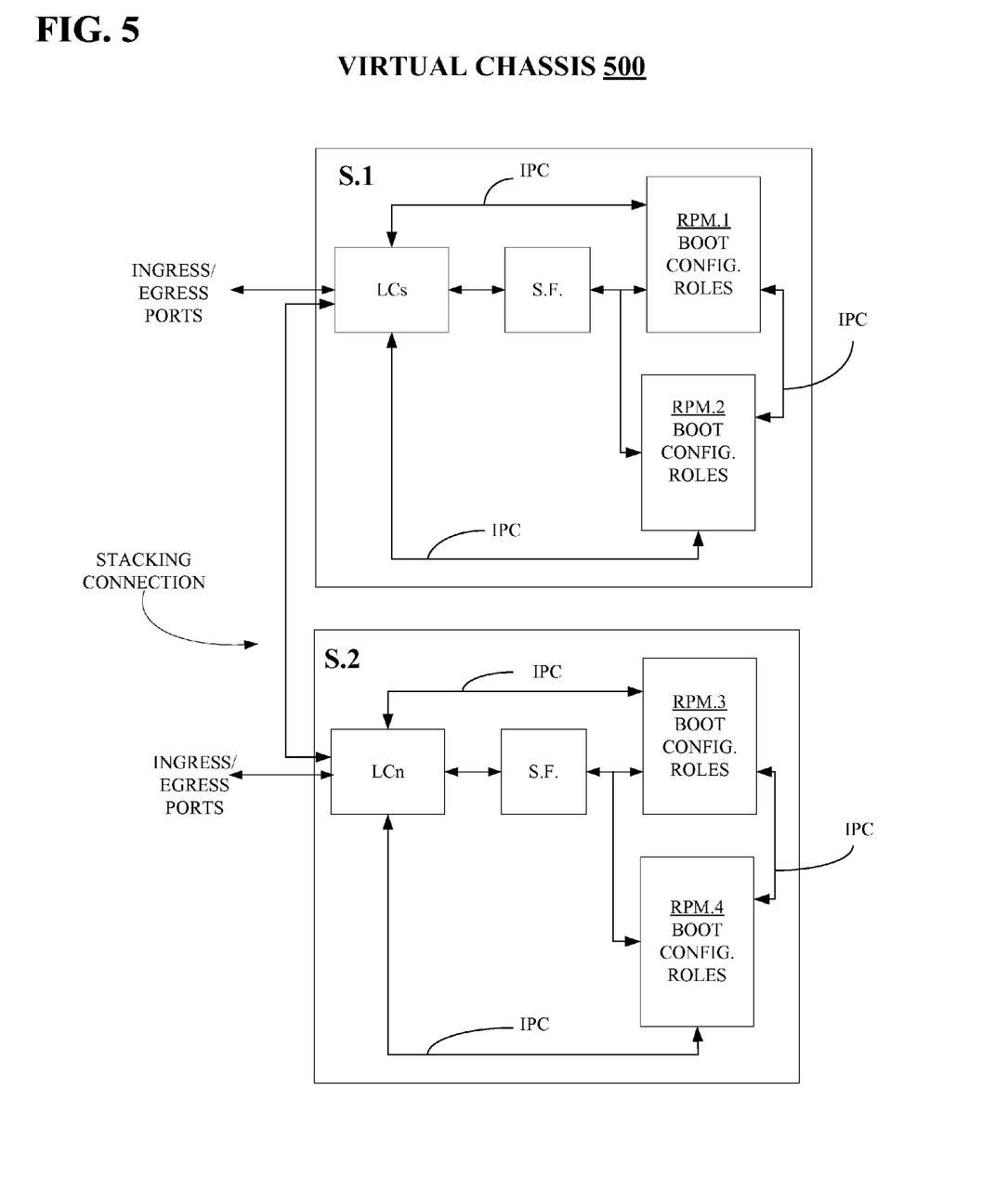
FIG. 5 is a block diagram showing functionality comprising a virtual chassis 500.

All four of the RPMs, RPM.1-RPM.4, in both switches of the virtual chassis 500 of FIG. 5 can include substantially the same functionality, and so only the functional elements of RPM.1 are described here. RPM.1 is shown to include a boot file, a configuration file and a roles module. The boot file includes routines that each RPM, RPM.1 in this case, initially accesses upon powering up the switch S.1 or upon inserting the route processing module, RPM.1, into the switch S.1 backplane (not shown). Each RPM runs routines included in the boot file to generally place the functional modules included in the switch (line cards, RPMs, power modules, switch fabric modules, etc.) into a state in which they can operate to perform functionality for which they are designed. The boot file also includes a routine that both RPMs in each switch run to discover the other RPM included in the switch and to determine which of the two RPMs included in the switch should assume the roles of chassis master and chassis standby. The configuration file can include information specific to each switch and to each RPM on each switch. Among other things, information comprising the configuration file is the user defined priority of each RPM and of each switch and the slot number of each RPM on each switch, the MAC address of each switch, the switch type or model number, the software version running on each switch and the unit number of each switch. The roles module includes routines that each RPM can run in order to perform the functionality included in each of the roles listed earlier in Table 1. The process employed to assign both switch level and stack level roles to each RPM comprising the virtual chassis 500 is described below with reference to FIG. 6.

FIG. 6 is a logical flow diagram of the process used to assign physical switch/chassis level roles and stack/virtual chassis level roles to each of the RPMs, RPM.1-RPM.4, comprising the two physical switches, S.1 and S.2, included in the virtual chassis 500 of FIG. 5. For the purpose of this description, an individual, physical switch and an individual, physical chassis are considered to be the same device. The chassis level roles can include the chassis master (CM) role and the chassis standby (CS) role, the stack level roles can include the stack master (SM) role, the stack standby (SS) role and the stack associate (SA) role, and the chassis and the stack level roles are assigned to RPMs in two sequential phases, where the first phase assigns the chassis level roles and the second phase assigns the stack level roles.

Figure 6A:
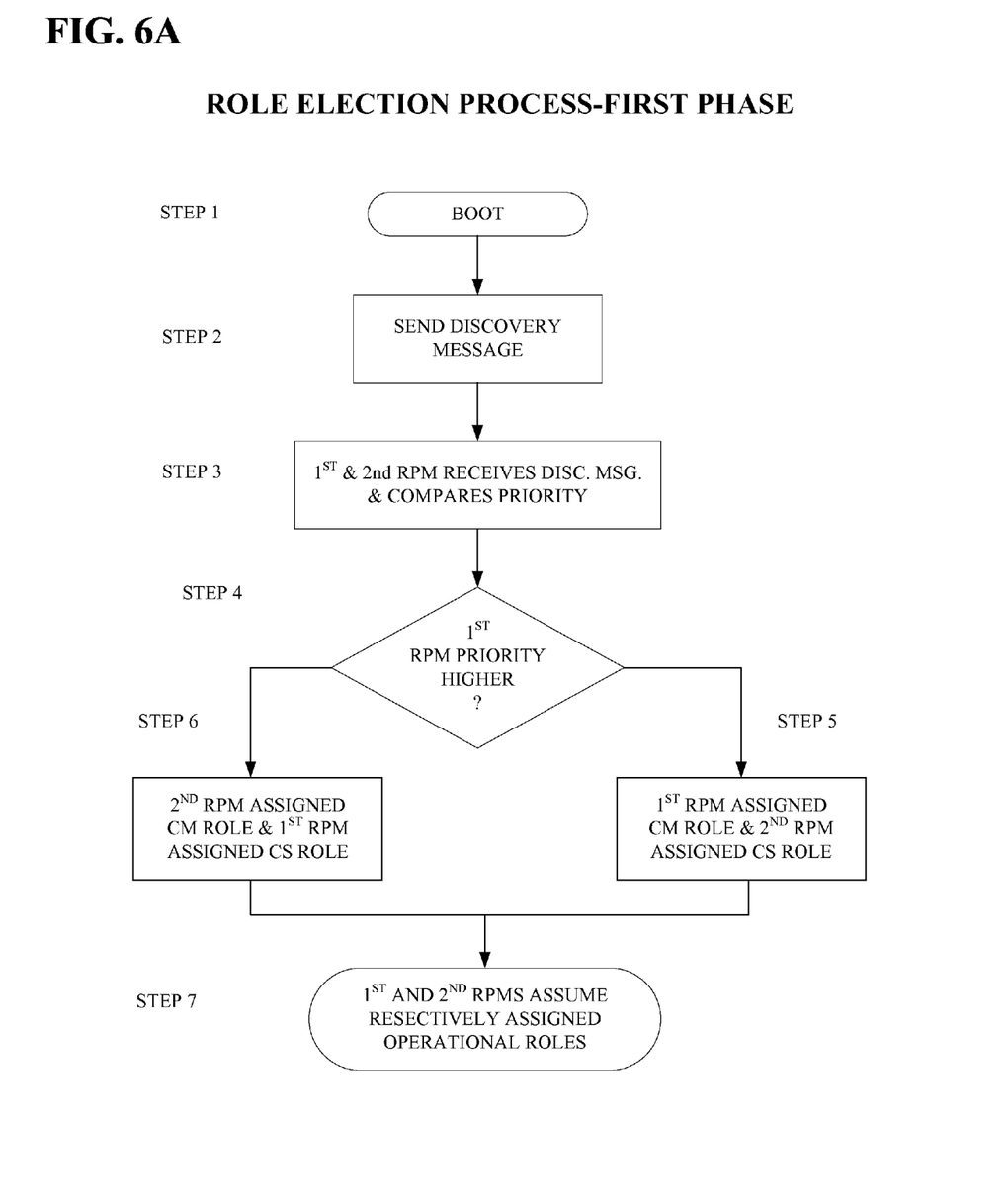
FIG. 6A is a logical flow diagram of a first phase of an RPM role election process.

Continuing to refer to FIG. 6A, in step 1 of the first phase of the role assignment process, each of the RPMs (referred to here as a first and second RPM) on switch S.1 and S.2 access and run a boot routine, which can be stored in memory on the RPM, to independently boot at the same time. In step 2, the boot routine causes both the first and second RPMs on each switch to send a discovery message over the IPC bus, to the other RPM on the same switch. The discovery message includes, among other things, information stored in the configuration file described with reference to FIG. 5 regarding their user defined priority within the switch. This user define priority can be their switch slot ID for instance. So, for example, the RPM with the lowest slot ID can be defined to be the higher priority RPM. In this case, S.1 and S.3 can be placed into their respective switches into a slot with the lowest slot ID, and so are define to have the higher priority in their respective switches. In step 3, both the first and second RPMs on each switch receive the discovery message sent by the other RPM in the switch, each RPM examines the user defined priority included in the message sent by the other RPM and compares this priority to the user defined priority included its configuration file. In step 4, if the user defined priority of the first RPM is higher than the second RPM on each switch, then in step 5, the first RPM on each switch assumes the role of chassis master (CM) and the second RPM on each switch assumes the role of chassis standby (CS), otherwise the second RPM assumes the CM role and the first RPM assumes the CS role.

With continued reference to FIG. 6, after determining what their initial role is, in step 7, the first and second RPMs on each switch, S.1 and S.2, accesses the appropriate routine in an RPM role module stored in RPM memory and proceeds to operate according to this role. According to the user defined RPM priorities in the virtual chassis 500 as described earlier, RPM.1 and RPM.3 will assume the role of chassis master, and RPM.2 and RPM.4 will assume the role of chassis standby. The chassis master is, among other things, generally responsible for the management of resources local to the switch in which it is located and for running certain processes. Local resources in this case are considered to be the switch fabric, line card image download and boot control, power/temperature measurement and management. The chassis master is also responsible for participating in election of the stack roles and is responsible for sending chassis state information to the chassis standby (CS) so that the CS can be maintained in a synchronous state with the CM. The chassis standby RPM is in a hot standby state and is, among other things, generally responsible for receiving state update information from the CM and, as will be described later with reference to a state diagram in FIG. 7, is responsible for monitoring the health of the CM. In this regard, the CS continually monitors the health of the CM by detecting periodic heart beat signals sent by the CM. In the event that a predetermined sequential number of such signals are not received, the CS determines that the CM has failed and transitions from the chassis standby role to the chassis master role.

Figure 6B:
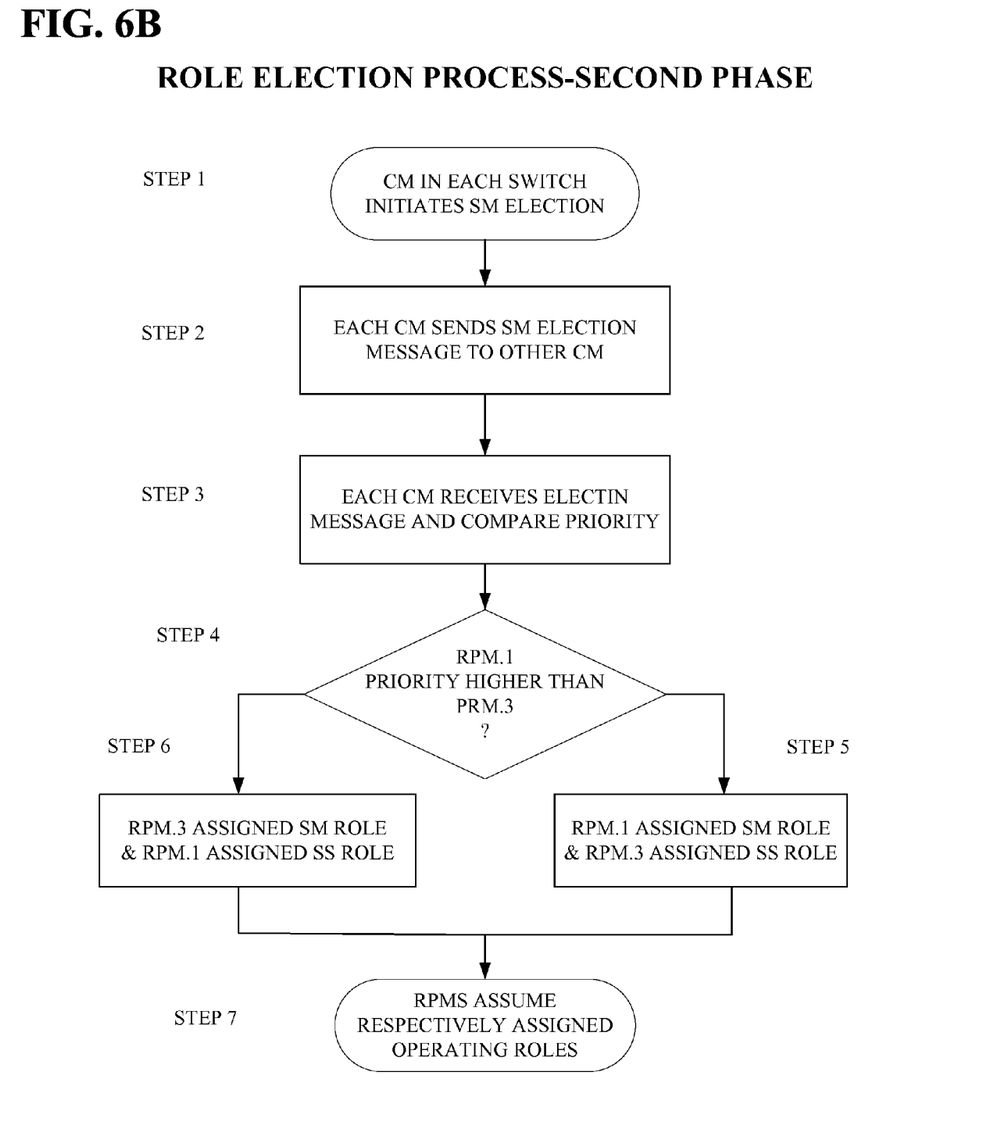
FIG. 6B is a logical flow diagram of a second phase of an RPM role election process.

Referring now to FIG. 6B, the RPM role assignment process enters its second phase where the stack roles are assigned. Subsequent to the completion of the first phase of the process, in step 1 of the second phase of process, the chassis master (CM) accesses and runs a sub-routine stored in the roles module that initiates the stack master (SM) election portion of the process. In this case as RPM.1 and RPM.3 have been elected to the chassis master roles in their respective switches, each these RPMs accesses and runs the SM election sub-routine. In step 2, RPM.1 and RPM.3 send a SM election message to each other which is comprised of user defined SM priority information included in the configuration file stored in memory in the respective RPM. Among other things, the information included in the SM election message can include the RPM Slot ID assigned to the RPM in the switch, the type of switch (model number) that the RPM is running on, the version of the software (Opsys) running on the switch, the unit number of the switch, a user defined switch priority and the MAC address of the switch, the presence/absence of CS and if present the RPM Slot ID of the CS. In step 3, both RPM.1 and RPM.3, in this case, receive the SM election message from the other RPM (RPM.3 and RPM.1 respectively) and compare the SM priority information included in the message to SM priority information stored in a configuration file associated with each RPM. In step 4, (assuming for the purpose of this description that RPM.1 is compared to be the RPM of the highest stack priority) if as the result of the comparison in step 3 it is determined that RPM.1 is of higher priority than RPM.3, then RPM.1 assumes the SM role and RPM.3 assumes the SS role. On the other hand if in step 3 it is determined that RPM.3 is the higher priority RPM, then in step 4 RPM.3 assumes the SM role and RPM.1 assumes the SS role.

After the SM RPM is elected, it runs the stack role election routine in order to assign stack level roles to the remaining RPMs in the virtual chassis 500. The remaining RPMs are assigned roles according to the following rules. If there is only one other CM in the virtual chassis, then it is assigned to be the SS. However, if there are more than two switches comprising the virtual chassis (in this case there are two or more CMs), then the CM with the highest user defined priority is assigned to be the SS. After the SS is assigned, then the remaining CM and all the CS are assigned the SA roles. It is the responsibility of the CM located on each chassis to inform the CS on the same chassis what role it should take. The CM also informs the CS (on the same chassis) of what role it is assigned.

Continuing to refer to FIG. 6B, in step 7 each of the RPMs, RPM.1-RPM.4 accesses the appropriate routine in a RPM role module stored in the corresponding RPM memory and proceeds to operate according to this role.

The RPM elected as SM in the second phase of the role assignment process of FIG. 6B, assumes responsibility for the overall management of the virtual chassis 500. This can include such things as running all of the management protocols like telnet, SSH that allow the user to log in and configure switches comprising the virtual chassis 500. RPM.1 can also be responsible for running all layer-2 and layer-3 control protocols such as the spanning tree protocol (STP), the open shortest path first (OSPF) protocol, the border gateway protocol (BGP) and also use the information accumulated as the result of running these protocols to build and maintain forwarding tables stored in line cards, for instance. More specifically, the SM periodically sends routing/switching table update messages to all of the LC CPUs on all of the other physical devices comprising the virtual chassis. The SM is also responsible for communicating its state (forward table information and other operational state information) information to the stack standby (SS) RPM so that the SS state is synchronized with the SM state in the event that the SM fails and the SS has to assume the SM role. The SM also operates to continually sense for a heart beat message from the SS, and in the event that the SS fails, select a SA to assume the SS role. The SA with the highest user defined priority, among the SAs in the virtual chassis is assigned to take over as new SS if the current SS fails. If the priorities of each SA are equal, then the one with the highest unit number is chosen. The SM also is responsible for sending information to the CM which the CM then uses to manage certain chassis specific resources (MGID for instance).

The RPM that is assigned and assumes a stack standby (SS) role is responsible for receiving state update messages over the IPC from the SM and using the information in the messages to synchronize its state with that of the SM (hot standby). The SS also is responsible for detecting periodic heart beat messages sent by the SM, over the IPC bus or the stacking connections, and in the event that a pre-determined sequential number of the heart beat messages are not received, determining that the SM has failed and transition to the SM role.

The SM also monitors the health of the SS by detecting a periodic heart beat message sent by the SS. If there is a failure of the SS, the SM initiates a new election which decides which of one or more SAs should transition to the SS role. Once the SA has transitioned to the SS role, the SM then synchronizes its full data base with the new SS, to bring it up to a state where it is fully a functional SS.

Figure 7A:
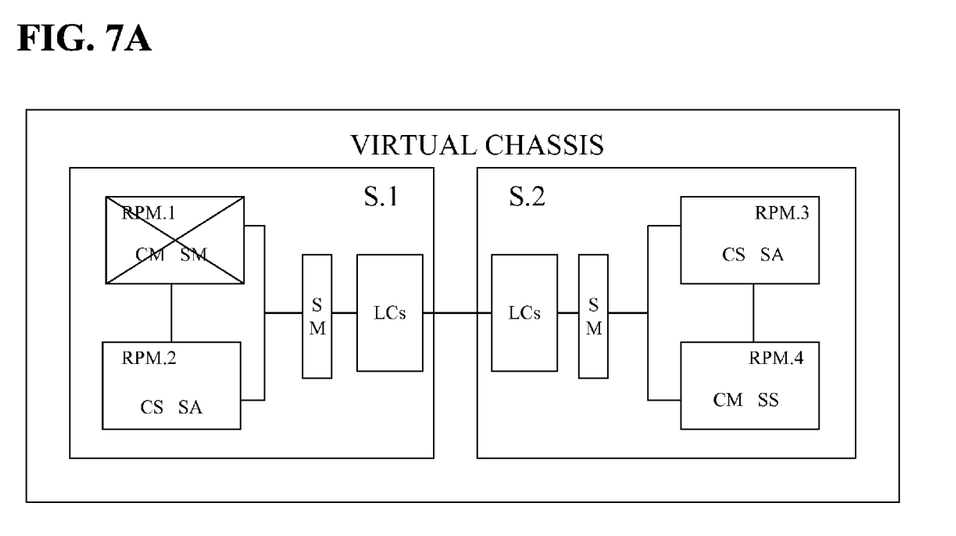
FIGS. 7A and 7B illustrates one scenario in which RPM roles change as the result of an RPM failure.
Figure 7B:
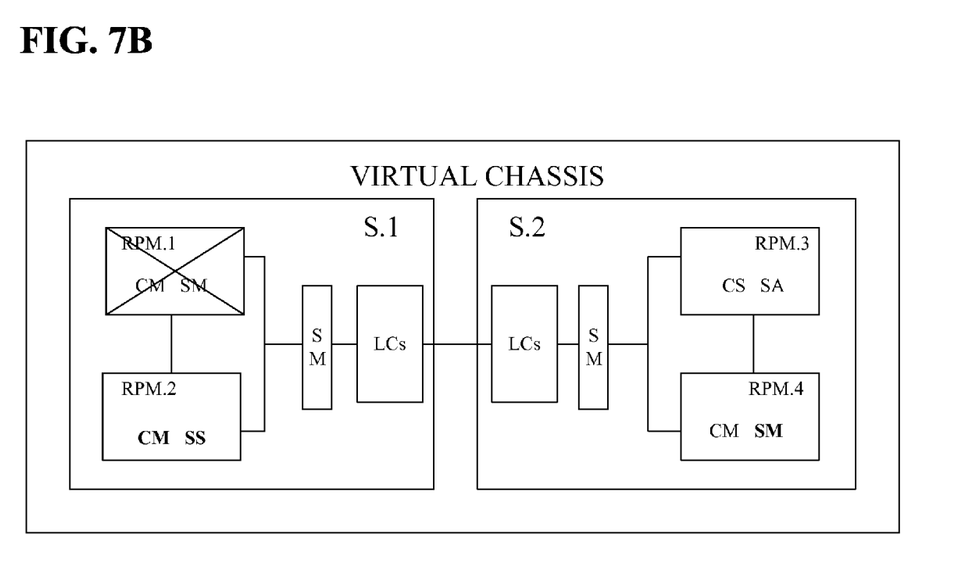

FIGS. 7A and 7B and 8A and 8B are block diagrams of the virtual chassis 500 of FIG. 5 illustrating the roles that each of the RPM can assume and the effect that a failure of one RPMs has on the state of the other RPMs in the virtual chassis. Referring first to FIG. 7A, as the result of the two phase role assignment process described with reference to FIGS. 6A and 6B, RPM.1 on switch S.1 of the virtual chassis 500 has assumed the CM and SM roles, and RPM.2 on switch S.1 has assumed the CS and SA roles. RPM.3 on switch S.2 of the virtual chassis 500 has assumed the CS and SA roles and RPM.4 on switch S.2 has assumed the CM and SS roles. FIG. 7A also shows that RPM.1 fails. This is indicated by the "X" superimposed over the block labeled RPM.1. In the event that RPM.2 (which is the CS in this case) on switch S.1 detects the cessation of a heart beat signal from RPM.1, and referring now to FIG. 7B, RPM.2 immediately transitions from its current roles (CS and SA) to the CM and SS roles (note that both of the roles that RPM.2 is assigned prior to the failure of RPM.1 change). Also, one of the two roles assigned to RPM.4 prior to the failure of RPM.1 also immediately transitions to a new role. That is, the SS role assigned to RPM.4 prior to the failure of RPM.1 transitions to the SM role subsequent to the failure of RPM.1, while the other role, that of CM, does not change. Subsequent to the failure of RPM.1, all of the roles assigned to all of the other RPMs comprising the virtual chassis 500 remain the same.

Figure 8A:
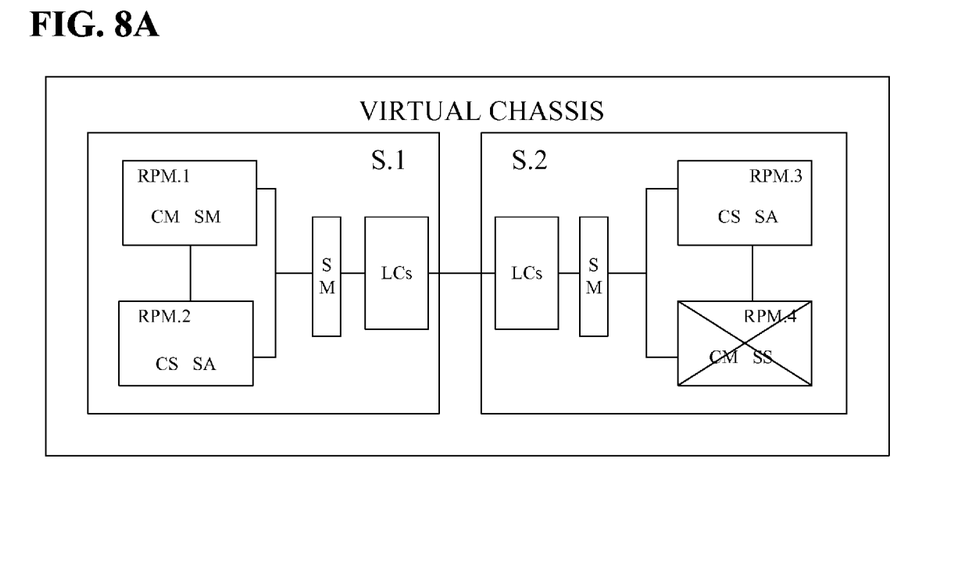
FIGS. 8A and 8B illustrate another scenario in which RPM roles change as the result of an RPM failure.
Figure 8B:
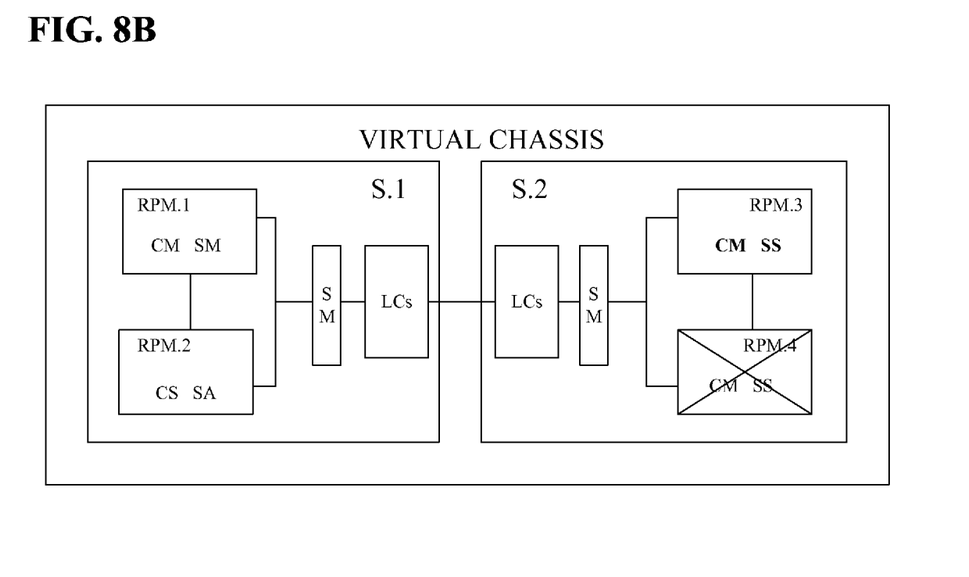

FIG. 8A is an illustration of the virtual chassis 500 of FIG. 5 showing that RPM.4 has failed. All of the roles assigned to each of the RPMs in FIG. 8A are the same as the roles were assigned to the RPMs in FIG. 7A, and so the roles assigned to these RPMs will not listed again here. Assuming that RPM.4 fails, as signified by the "X" superimposed over the block labeled RPM.4, and since RPM.4 was running as the CM for switch S.2 and also operating in the role of SS for the SM RPM.1 in switch S.1, RPM.3 in switch S.2 detects that RPM.4 has failed and both of the roles assigned to RPM 3 immediately transition to different roles, wherein the CS role transitions to the CM role and the SA role transitions to the SS role. In this scenario, no other roles on any of the other RPMs in the virtual chassis 500 change.

Operating in this manner, the virtual chassis 500 can easily tolerate the failure of one RPM on any of the switches comprising the virtual chassis 500 with only the temporary loss of overall virtual chassis functionality. Indeed, virtual chassis functionality is only lost during the time it takes for the roles running on an operating RPM to transition to take over the roles that were running on the failed RPM.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A virtual chassis, comprising:
a plurality of stacked physical chassis that operate in a manner so as to appear to a connecting network as a single, logical chassis;
a first physical chassis of the plurality of physical chassis including:
a first route processing module that is configured to operate in a virtual chassis management role to manage the virtual chassis, and that is configured to operate in a first physical chassis management role to manage the first physical chassis; and
a second route processing module that is configured to operate in a first physical chassis standby role to transition to the first physical chassis management role in the event of a failure of the first route processing module; and
a second physical chassis of the plurality of physical chassis that is stacked with the first physical chassis and that includes:
a third route processing module that is configured to operate in a virtual chassis standby role to transition to the virtual chassis management role in the event of a failure of the first route processing module, and that is configured to operate in a second physical chassis management role to manage the second physical chassis; and
a fourth route processing module that is configured to operate in a second physical chassis standby role to transition to the second physical chassis management role in the event of the failure of the third route processing module;
wherein the second route processing module is configured to operate in a virtual chassis associate role to transition to the virtual chassis standby role in the event of at least one of: a status change by the third route processing module to the virtual chassis management role, and a failure of the third route processing module.

2. The virtual chassis of claim 1, wherein the plurality of physical chassis run one or more layer-2 network protocols.

3. The virtual chassis of claim 1, wherein the plurality of physical chassis run one or more layer-3 network protocols.

4. The virtual chassis of claim 1, wherein the plurality of physical chassis are one or both of a network switch and a router.

5. The virtual chassis of claim 1, wherein each of the first route processing module, the second route processing module, the third route processing module, and the fourth route processing module are comprised of one or more separate processors.

6. The virtual chassis of claim 1, wherein the fourth route processing module is configured to operate in a virtual chassis associate role to transition to the virtual chassis standby role in the event of a status change by the third route processing module to the virtual chassis management role.

7. The virtual chassis of claim 1, wherein the fourth route processing module is configured to operate in a virtual chassis associate role to transition to the virtual chassis standby role in the event of a failure of the third route processing module.

8. A method of operating a virtual chassis, comprising:

assigning a virtual chassis management role and a first physical chassis management role to a first route processing module in a first physical chassis and, in response, using the first route processing module to manage each of the first physical chassis and a virtual chassis that include the first physical chassis stacked with a second physical chassis;

assigning a virtual chassis associate role to a second route processing module in the first physical chassis;

assigning a virtual chassis standby role and a second physical chassis management role to a third route processing module in the second physical chassis and, in response, using the third route processing module to manage the second physical chassis;

detecting a failure of the first route processor module and, in response:

transitioning the third route processing module from the virtual chassis standby role to the virtual chassis management role and, in response, using the third route processing module to manage each of the second physical chassis and the virtual chassis; and transitioning the second route processing module from the virtual chassis associate role to the virtual chassis standby role.

9. The method of claim 8, further comprising:

assigning a first physical chassis standby role to the second route processing module; and transitioning the second route processing module to the first physical chassis management role in response to detecting the failure of the first route processing module.

10. The method of claim 8, wherein the first physical chassis and the second physical chassis include a network layer-2 switch, a network layer-3 router or both.

11. The method of claim 8, wherein each of the first route processing module, the second route processing module, and the third route processing module, are comprised of one or more separate processors.

12. The method of claim 8, further comprising:

assigning a second physical chassis standby role to a fourth route processing module in the second physical chassis; and detecting a failure of the third route processing module and, in response, transitioning the fourth route processing module to the second physical chassis management role and transitioning the second route processing module, that was previously transitioned from the virtual chassis associate role to the virtual chassis standby role, to the virtual chassis management role.

13. The method of claim 8, further comprising:

synchronizing state information between the first route processing module and the third route processing module prior to detecting the failure of the first route processing module.

14. A method of operating a virtual chassis, comprising:

assigning a virtual chassis management role and a first physical chassis management role to a first route processing module in a first physical chassis and, in response, using the first route processing module to manage the first physical chassis and a virtual chassis that includes the first physical chassis stacked with a second physical chassis;

assigning a virtual chassis associate role and a first physical chassis standby role to a second route processing module in the first physical chassis;

assigning a virtual chassis standby role and a second physical chassis management role to a third route processing module in the second physical chassis;

assigning a second physical chassis standby role to a fourth route processing module in the second physical chassis;

detecting a failure of the first route processing module and, in response:

transitioning the third route processing module from the virtual chassis standby role to the virtual chassis management role and, in response, using the third route processing module to manage the virtual chassis; and transitioning the second route processing module from the virtual chassis associate role to the virtual chassis standby role.

15. The method of claim 14, further comprising:

assigning a virtual chassis associate role to the fourth route processing module in the second physical chassis; and transitioning the fourth route processor module from the virtual chassis associate role to the virtual chassis standby role in response to the transitioning of the second route processor module from the virtual chassis standby role to the virtual chassis management role.

16. The method of claim 14, further comprising:

transitioning the second route processing module from the first physical chassis standby role to the first physical chassis management role in response to detecting the failure of the first route processing module.

17. The method of claim 14, further comprising: transitioning the fourth route processing module from the second physical chassis standby role to the second chassis management role in response to detecting a failure of the second route processing module.

* * * * *